(12) United States Patent
Kennedy

(10) Patent No.: US 10,029,190 B2
(45) Date of Patent: Jul. 24, 2018

(54) OIL-WATER SEPARATOR

(71) Applicant: Pacific Petroleum Recovery Alaska, LLC, Anchorage, AK (US)

(72) Inventor: Kevin Kennedy, Anchorage, AK (US)

(73) Assignee: Pacific Petroleum Recovery Alaska, LLC, Anchorage, AK (US)

( * ) Notice: Subject to any disclaimer, the term of this patent is extended or adjusted under 35 U.S.C. 154(b) by 0 days.

(21) Appl. No.: 15/185,414

(22) Filed: Jun. 17, 2016

(65) Prior Publication Data

US 2016/0367912 A1 Dec. 22, 2016

Related U.S. Application Data

(60) Provisional application No. 62/182,430, filed on Jun. 20, 2015, provisional application No. 62/183,165, filed on Jun. 22, 2015.

(51) Int. Cl.
*B01D 17/032* (2006.01)
*B01D 17/12* (2006.01)
(Continued)

(52) U.S. Cl.
CPC ......... *B01D 17/0214* (2013.01); *B01D 17/12* (2013.01); *B01D 21/0039* (2013.01);
(Continued)

(58) Field of Classification Search
CPC ....... B01D 17/0214; B01D 17/12; C02F 1/40; E02B 15/045
(Continued)

(56) References Cited

U.S. PATENT DOCUMENTS

| 738,743 A | 9/1903 | Gilmore |
|---|---|---|
| 1,645,093 A | 8/1927 | Comyn |

(Continued)

FOREIGN PATENT DOCUMENTS

| DE | 4119549 | * | 9/1995 |
|---|---|---|---|
| DE | 19502871 A1 | | 12/1995 |

*Primary Examiner* — Christopher Upton
(74) *Attorney, Agent, or Firm* — James A. Bradburne

(57) ABSTRACT

An oil-water separator for separating mixed density fluids, such as oil and water, oily sediment laden water and the like, as well as portable, in-tank and towable and anchorable boom containment systems kits and methods employing the same. The oil-water separator employs at least two oil-separation chambers operating in opposing but synergistic separation modes in parallel. The oil-separation chambers alternate distribution of a single mixed fluid density stream between the chambers using a partial vacuum source to draw the stream into one chamber, while concurrently stopping inflow of the stream into another chamber by removing the vacuum source. The apparatus allows each chamber to switch back and forth between (a) actively separating and removing less dense fluid (e.g., oil) when the partial vacuum is applied, and (b) passively separating the less dense fluid (e.g., oil) and removing the more dense fluid (e.g., water) when the partial vacuum source is removed. The oil-water separator can be adapted for multiple different uses, including rapid deployment cleanup kits that are sufficiently lightweight and compact for easy transport, access and application.

30 Claims, 4 Drawing Sheets

(51) Int. Cl.
    *C02F 1/40* (2006.01)
    *B01D 17/02* (2006.01)
    *E02B 15/04* (2006.01)
    *B01D 21/00* (2006.01)
    *C02F 101/32* (2006.01)

(52) U.S. Cl.
    CPC .............. *C02F 1/40* (2013.01); *E02B 15/045* (2013.01); *C02F 2101/32* (2013.01); *C02F 2201/005* (2013.01); *C02F 2301/063* (2013.01)

(58) Field of Classification Search
    USPC .................... 210/104, 521, 533, 539, 540
    See application file for complete search history.

(56) References Cited

U.S. PATENT DOCUMENTS

| | | | |
|---|---|---|---|
| 3,481,469 A | 12/1969 | Walker | |
| 3,909,416 A | 9/1975 | Veld | |
| 3,937,662 A * | 2/1976 | Bartik | B01D 17/0214 210/104 |
| 4,064,054 A | 12/1977 | Anderson et al. | |
| 4,123,365 A | 10/1978 | Middlebeek | |
| 4,132,652 A * | 1/1979 | Anderson | B01D 17/0211 210/521 |
| 4,366,058 A | 12/1982 | Wolde-Michael | |
| 4,396,503 A | 8/1983 | Tannehill | |
| 4,422,931 A | 12/1983 | Wolde-Michael | |
| 4,436,630 A * | 3/1984 | Anderson | B01D 17/0214 210/533 |
| 4,623,452 A | 11/1986 | Peterson | |
| 4,722,800 A | 2/1988 | Aymoung | |
| 5,236,585 A | 8/1993 | Fink | |
| 5,433,845 A | 7/1995 | Greene et al. | |
| 5,587,065 A * | 12/1996 | Burns | B01D 17/0214 210/104 |
| 5,766,470 A | 6/1998 | Burns | |
| 5,922,064 A * | 7/1999 | Gordon, Sr. | C02F 1/40 210/521 |
| 6,033,575 A * | 3/2000 | Perret | B01D 17/0208 210/521 |
| 6,129,839 A * | 10/2000 | Mains, Jr. | B01D 17/0211 210/540 |
| 6,149,802 A | 11/2000 | Zavarise et al. | |
| 6,261,462 B1 * | 7/2001 | Batten | B01D 17/0214 210/533 |
| 6,413,435 B1 * | 7/2002 | Kyles | B01D 17/0214 210/540 |
| 6,899,231 B2 | 5/2005 | Larsson | |
| 6,923,872 B2 | 8/2005 | Hyisong | |
| 7,611,635 B2 * | 11/2009 | Chieng | B01D 17/0214 210/539 |
| 7,810,351 B2 | 8/2010 | Westermeyer | |
| 8,114,283 B2 | 2/2012 | Parkinson | |
| 8,906,142 B2 | 12/2014 | Peuker | |
| 2003/0062324 A1 | 4/2003 | Abrams et al. | |
| 2013/0240425 A1 | 9/2013 | Jauncey et al. | |

\* cited by examiner

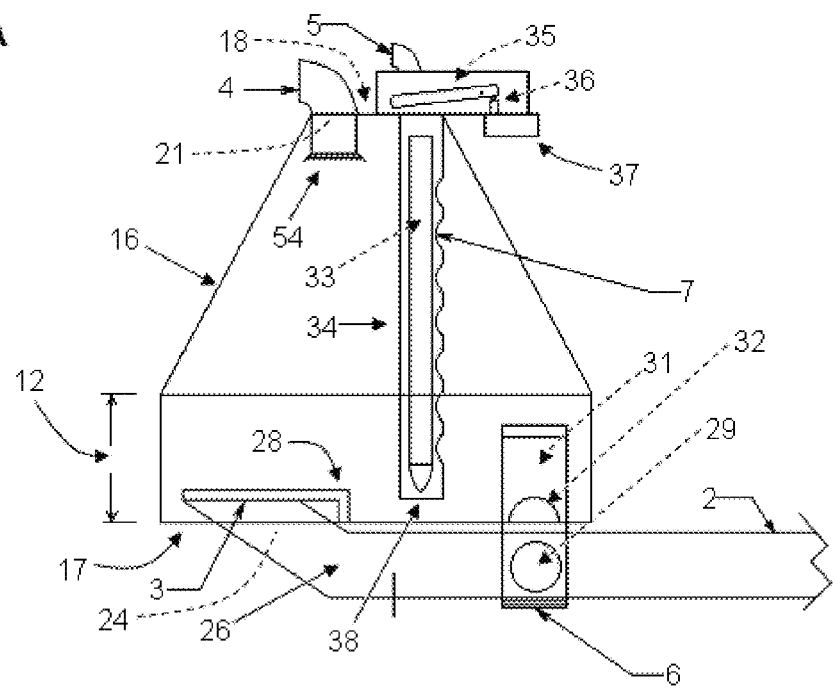
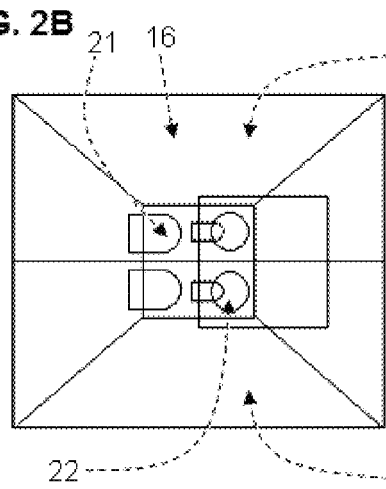
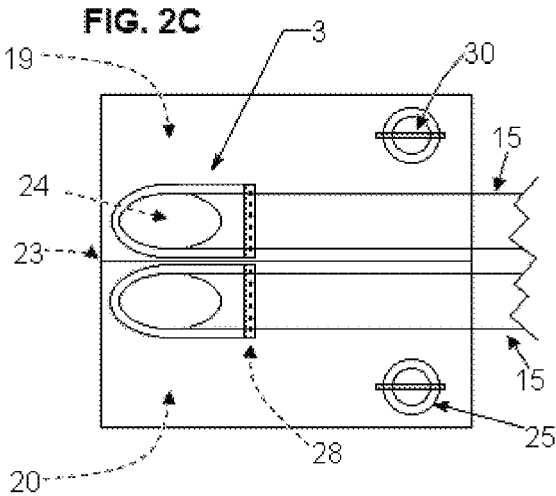
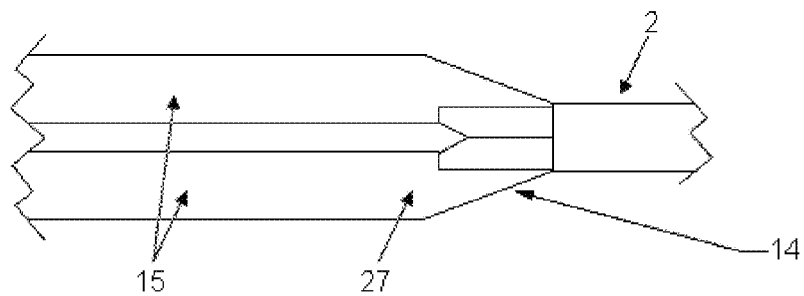

FIG. 3
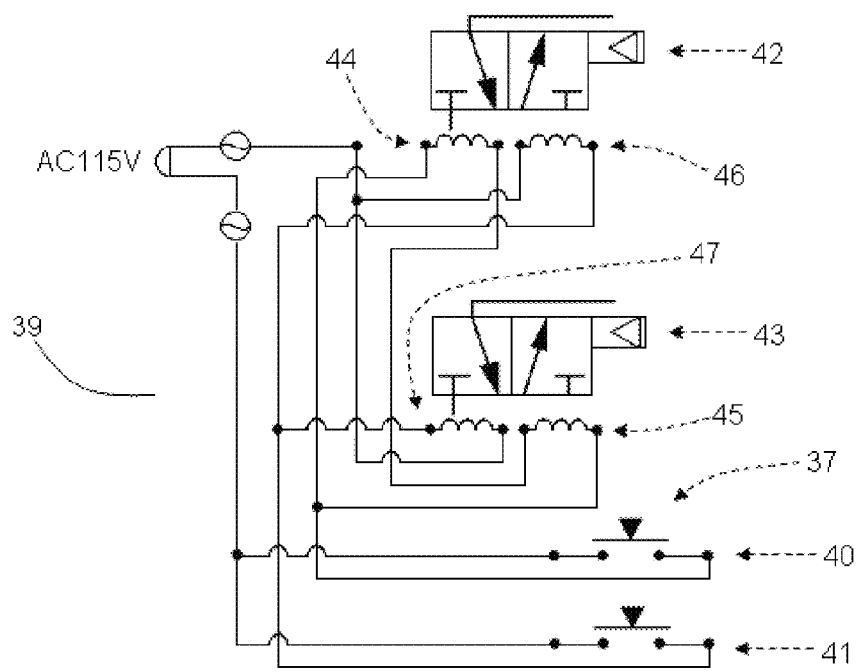
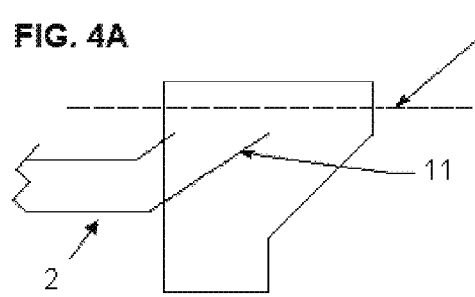
FIG. 4A
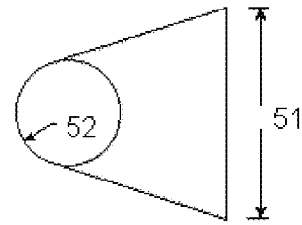
FIG. 4C
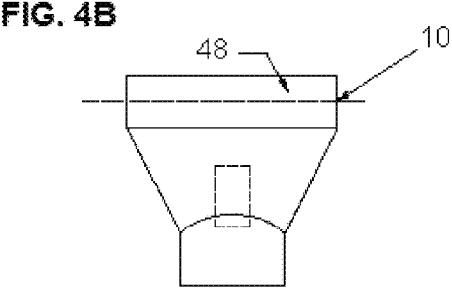
FIG. 4B
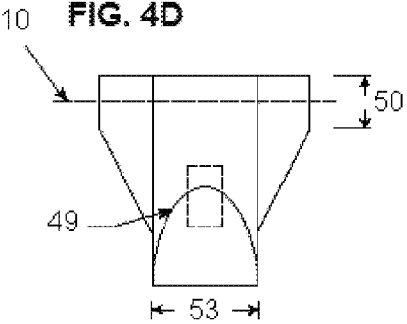
FIG. 4D

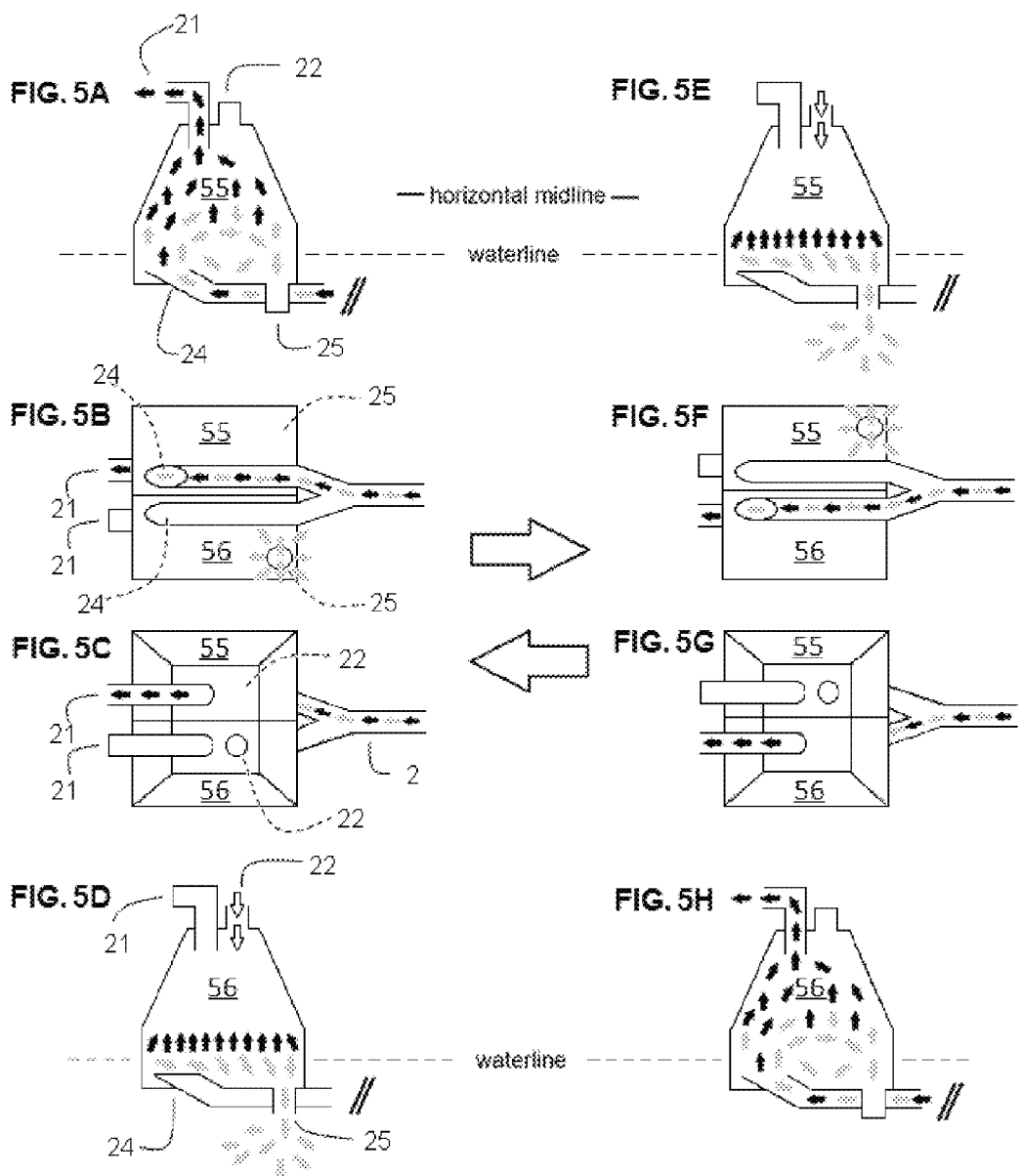

OIL-WATER SEPARATOR

CROSS-REFERENCE TO RELATED APPLICATION

This application claims priority benefit to U.S. Provisional Application No. 62/182,430, filed Jun. 20, 2015, and U.S. Provisional Application No. 62/183,165, filed Jun. 22, 2015, which references are incorporated herein by reference in their entirety.

FIELD

The field of the disclosure relates generally to devices and processes for separating fluids, including sediment laden fluids, and more specifically, to recovering contaminants such as oil from water and sediments.

BACKGROUND

Oil spills result in serious damage to the environment. The primary tools used to respond to oil spills are mechanical containment, recovery, and cleanup equipment. Such equipment includes a variety of booms, barriers, and skimmers (see, e.g. Oil Spill Science and Technology: Prevention, Response, and Cleanup. 2010, Ed. Mervin Fingas, Elsevier).

One of the most important tools for oil spill response is the skimmer, which recovers oil from the water surface. Of the three main types—weir, oleophilic, and suction—the suction skimmer is generally the most efficient.

The suction skimmer operates like a household vacuum cleaner. Oil is sucked up through floating heads and pumped into storage tanks. Depending on the oil content and its condition, the oily waste water is further treated to separate the oil and water, and then the recovered materials recycled or sent to an approved facility for disposal.

One approach to treat the recovered oily waste water is an oil-separator system such as gravity settling tanks in which the lighter oil gradually floats to the top. A large variety of gravity settling tanks have been developed, including horizontal and vertical two- and three-phase separators, as well as central inlet and central outlet separators.

The settling tanks or gravity separators are sometimes incorporated into skimmers. However, they are more often installed on shore or recovery ships or barges due to the their size and need to process massive volumes of water initially recovered along with the oil from the contaminated water's surface. Another reason is that they require stable platforms to limit movement and avoid remixing of the oil and water phases.

Yet the majority of the oil is still left behind in the environment due in large part to the limitations of the existing skimmers used for initial response. One of the major challenges is that skimmers tend to recover more water than oil, especially when rocking in choppy waters. Other disadvantages with skimmers are their vulnerability to clogging with debris and restriction of access to areas often most impacted by spills, such as tidal or shoreline areas.

These and other drawbacks have left large gaps in effective oil spill response.

There is a clear need for improved oil-water separators, systems and methods, as well as products and methods for recovering oil and other lighter-than water contaminants from water. A particular need exists for oil-water separators in rapid response oil recovery systems, which should be compact, simple to deploy, and process large volume flow rates among other things while avoiding unwanted co-recovery of too much water when cleaning up oil spills in multiple different environments. The present disclosure addresses these and other needs.

BRIEF SUMMARY

The present disclosure provides an oil-water separator useful for separating mixed density fluids, such as oil from water, including sediment laden fluids, as well as kits and systems employing the same. The processes include various methods of using the oil-water separator. The oil-water separator is particularly useful for industrial or emergency response applications as part of towable or anchorable skimmer and dredge systems for cleaning up oil spills in open bodies of water and coastal environments.

The oil-water separator comprises:
an oil-water main feeding an oil-water manifold having a first distribution branch feeding a first oil separation chamber, and a second distribution branch feeding a second oil separation chamber, the first and second oil separation chambers each individually comprising as components:
  (i) upper and lower portions relative to horizontal joined through side walls and defining a substantially sealed enclosure for containing a fluid therein;
  (ii) an oil-water inlet located in a lower portion of the chamber and receiving a distribution branch from the oil-water main to define an oil-water flow path from the oil-water main into the chamber;
  (iii) a water outlet located in a lower portion of the chamber and defining a water flow path from inside to outside the chamber;
  (iv) an oil outlet located in an upper portion of the chamber and defining an oil flow path from inside to outside the chamber;
  (v) an air inlet located in an upper portion of the chamber and defining an air flow path from outside to inside the chamber; and
  (vi) a valve system comprising valves in fluid communication with and regulating the flow paths of the oil-water inlet, the water outlet, the oil outlet, and the air inlet, the valve system having first and second valve settings:
    the first valve setting (a) to open the oil-water flow path of the oil-water inlet and the oil flow path of the oil outlet, and to close the air flow path of the air inlet and the water flow path of the water outlet; and
    the second valve setting (b) to close the oil-water flow path of the oil-water inlet and the oil flow path of the oil outlet, and to open the air flow path of the air inlet and the water flow path of the water outlet; and
  a valve control system to alternate opposing valve settings (a) and (b) between the first and second oil separation chambers.

The methods of the disclosure involve separating mixed density fluids, such as oil from water, by placing the subject oil-water separator in operation. In one embodiment, the method comprises:
placing the oil-water separation in a body of water and supplying a mixed density fluid stream to the oil-water main of the subject oil-water separator;
applying a partial vacuum to the oil outlet of the chamber having the open oil flow path to withdraw fluid therefrom, and supplying air or similar gas to the air inlet of the chamber having the open air flow path to supply air thereto; and
alternating valve settings (a) and (b) between the first and second oil separation chambers.

The kits of the disclosure include the subject oil-water separator, particularly as a kit for rapid deployment and oil-spill recovery. In one embodiment, the kit comprises: an oil-water separator according to the disclosure, and optionally, one or more of the following components selected from a vacuum pump, hose, water pump, electronic controller unit, a skimmer head for attaching to the oil-water main, a dredge nozzle for attaching to the oil-water main, a towable boom system for attaching and channeling product into the skimmer head, a water tank, an product recovery tank.

BRIEF DESCRIPTION OF THE FIGURES

FIGS. 2A-2D depicts various views of an oil-water separator of the disclosure. FIG. 2A is a transparent side view. FIG. 2B is a top down view. FIG. 2C is a bottom up view. FIG. 2D is a bottom up view an oil-water main and manifold with distribution branches of the oil-water separator shown in FIG. 2C.

FIG. 3 is depicts a valve control circuit for an oil-water separator of the disclosure.

FIGS. 4A-4D depicts a skimmer head attachment for an oil-water separator of the disclosure. FIG. 4A depicts a transparent side view. FIG. 4B depicts a transparent front view. FIG. 4C depicts a top down view. FIG. 4D depicts a transparent rear view.

FIGS. 5A-5H depicts various views of an oil-water separator of the disclosure in operation.

DESCRIPTION OF SPECIFIC EMBODIMENTS

Figure 1:
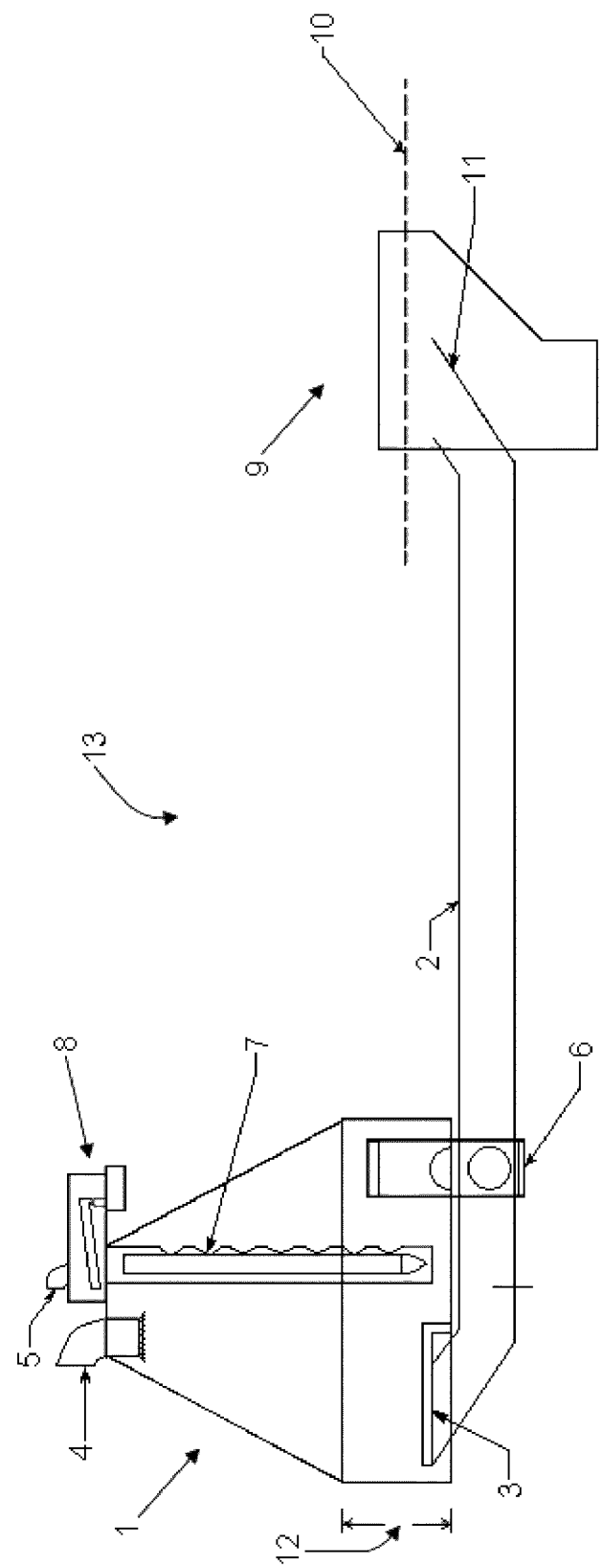
FIG. 1 is a cross sectional transparent side view of an oil-water separator with a skimmer head attachment of the disclosure.

As summarized above, the present disclosure is directed to an oil-water separator, as well as methods of use and recovery systems and kits employing the same.

The oil-water separator employs at least two oil separation chambers capable of operating in opposing but synergistic separation modes in parallel to process a common mixed fluid density stream in a continuous flow manner.

The oil-water separator includes an oil-water main feeding an oil-water manifold having a first distribution branch feeding a first oil separation chamber, and a second distribution branch feeding a second oil separation chamber. Each of the first and second oil separation chambers are fluidly sealed and include an oil-water inlet, an oil outlet, an air inlet, and a water outlet. The oil-water inlet and water outlet are located in a lower portion, while the oil outlet and air inlet are located in an upper portion of each chamber. The distribution branches are in fluid communication with and feed the oil-water inlets.

The oil-water separator also includes a plurality of valves to regulate the flow paths of the inlets and outlets. The oil-water separator further includes a valve control system to control the opening and closing of the valves and alternate opposing valve settings between the chambers.

In general, the first and second oil separation chambers each include two basic valve settings. In the first setting, the flow paths of the oil-water inlet and oil outlet are open, and the flow paths of the air inlet and water outlet are closed. In the second setting, the flow paths of the oil-water inlet and oil outlet are closed, and the flow paths of the air inlet and water outlet are open.

In operation one chamber is set to the first valve setting, and the other chamber is set to the second valve setting. The valve control system is utilized to alternate these settings between the chambers such that when one chamber is one valve setting, the other chamber is in the opposite valve setting.

By way of example, when placed in normal operation the oil-water separator is usually attached to a skimmer head, dredge nozzle, or any other suitable attachment, to collect and feed a mixed density fluid stream to the oil-water main. A vacuum or similar pump is attached and in fluid communication with each oil outlet of each oil separation chamber to apply a partial vacuum thereto and withdraw fluid therefrom, depending on the valve settings. The oil-water separator when deployed is positioned upright in a body of water such that the water outlets are below and the air inlets above waterline, the mixed density fluid is supplied to the oil-water main, and the pump turned on so as to apply a partial vacuum to oil outlet of the oil-separation chamber having the first valve setting. Application of the partial vacuum to the oil-separation chamber having the first valve setting draws the mixed density fluid into this chamber from the oil-water main, placing the chamber in active processing mode. At the same time, the partial vacuum source to the other chamber in the second valve setting is turned off or blocked, blocking the inflow of the mixed density fluid into this chamber, and placing the chamber in passive processing mode. The valve control system is utilized to alternate the first and second valve settings to switch the chambers back and forth between active and passive processing modes to process the incoming mixed density fluid stream in a continuous manner.

More specifically, in one oil separation chamber the valves are initially set to the first valve setting. The first valve setting allows for the application of a partial vacuum to the oil outlet of this chamber. Application of the partial vacuum to the oil outlet draws the mixed density fluid stream (e.g., oil and water) into this chamber through its oil-water inlet while removing the less dense fluid (e.g., oil) out through the oil outlet.

In the other chamber, the valves are set to a second position that is opposite of the first. The second valve setting shuts off access to the vacuum source and inflow of the mixed fluid density stream, while at the same time opening the chamber to atmosphere through its air inlet, thereby allowing the more dense fluid (e.g., water) to discharge through the water outlet of this chamber.

Over time, the mixed density fluid in the chamber open to atmosphere increasingly separates under the force of gravity and discharge of the heaver fluid from the lower portion of the chamber such that the lighter material floating on the surface is now much more concentrated and ready for removal. At the same time, the chamber under vacuum continues to receive the inflowing mixed density fluid stream and accumulates more and more of the heavier fluid since the less dense fluid floating on top is being actively removed from the upper portion of the chamber through the oil outlet.

By reversing the valve settings between these chambers, the heaver fluid accumulated in the chamber previously under vacuum is now discharged, and the less dense fluid concentrated in the chamber previously open to atmosphere is now subject to active removal by the partial vacuum force. In addition, since the valve settings between the chambers are now reversed, the process can be continuously repeated in further alternating cycles without having to delay or stop the inflow of the mixed density fluid stream into the system.

This opposing but synergistic separation mode system operating in parallel allows the oil-water separator of the present disclosure to process a continuous stream of contaminated fluid with very high product recovery efficiencies, even when the incoming stream contains disproportionately larger amounts of water.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims. In addition, many modifications may be made to adapt a particular situation, material, composition of matter, process, process step or steps, to the objective, spirit and scope of the present invention. All such modifications are intended to be within the scope of the claims made herein.

In this specification and the appended claims, the singular forms "a," "an" and "the" include plural reference unless the context clearly dictates otherwise. Conversely, it is contemplated that the claims may be so-drafted to exclude any optional element. This statement is intended to serve as antecedent basis for use of such exclusive terminology as "solely," "only" and the like in connection with the recitation of claim elements or by use of a "negative" limitation.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Also, it is contemplated that any optional feature of the inventive variations described herein may be set forth and claimed independently, or in combination with any one or more of the features described herein.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

All existing subject matter mentioned herein (e.g., publications, patents, patent applications and hardware) is incorporated by reference herein in its entirety. The referenced items are provided solely for their disclosure prior to the filing date of the present application. Nothing herein is to be construed as an admission that the present invention is not entitled to antedate such material by virtue of prior invention.

In further describing the subject apparatus, the oil-water separator is described first in greater detail, followed by a detailed description of exemplary embodiments, and then a review of various kits and deployment systems that may find use with the subject oil-water separator, as well as a discussion of various representative applications and advantages thereof.

Oil-Water Separator

As described above, the oil-water separator includes an oil-water main feeding an oil-water manifold having a first distribution branch feeding a first oil separation chamber, and a second distribution branch feeding a second oil separation chamber.

A featured aspect is where the oil-water main, manifold and distribution branch assembly defines a low turbulence flow path feeding each chamber. The low turbulence flow path is generally one in which the oil-water main, oil-water manifold and distribution branches are disposed in a horizontal plane, and typically at or below waterline. In certain embodiments, the low turbulence flow path is a substantially unobstructed conduit with bend angles of about 30 degrees or less, with bend angles of about 22.5 degrees being of specific interest. The low turbulence flow path helps to reduce unwanted fluid mixing. It also aids in maintaining the nature and shape of the fluid stream into the chambers when the apparatus is placed under normal operation. For example, when the mixed density fluid stream in the oil-water main is a horizontal vortex moving through the main, the low turbulence flow path from the main through to a given chamber helps to preserve the vortex shape of the flow into that chamber. Such aspects are particularly well suited for open water skimmer applications to minimize excessive mixing of the product collected from the water's surface. In as many embodiments, the oil-water main is in fluid communication with a skimmer head, the skimmer head optionally also including low turbulence features.

In some embodiments, the oil-water separator is configured to remove lighter-than-water contaminants, such as oil, from sediment and larger solid matter. For example, contaminated sand, gravel, mud and the like are commonly found on shorelines, tidal areas, beaches etc. and the like after an oil spill and require cleaning. So in adapting the oil-water separator of the present disclosure for this particular application, the oil-water main can be fitted with an attachment that is better suited for this purpose. For example, a skimmer head if attached can be replaced with a nozzle, such as a dredge nozzle. Generally, the dredge nozzle attachment is coupled directly to the oil-water main or through conduit extensions, such as hose extensions. The dredge nozzle includes a jet tube to which a water pump with hose is attached to supply a stream of water from the water pump into the jet tube. This added water aids in wetting and washing contaminants off of the solids as well as transporting the materials into the oil-water separation chamber.

Depending on the water volume and pressure supplied to the jet tube of the dredge nozzle, a suction can be created in the oil-water main if the water pressure is high enough. One or more booster jets can be added in line with the oil water main or extensions when the distance between the dredge nozzle and the oil-water separator becomes long enough to reduce the flow rate and suction below a desired level. Nevertheless, at high enough water pressure, the suction generated by the jet tube's venturi effect is generally sufficient to suck-up sand, gravel, and the like and even large rocks. Thus in many embodiments the dredge nozzle includes a nozzle restrictor to limit the sediment size sucked up into the nozzle. Of course a suitable vacuum, suction or other pump attached to the oil outlet of the oil-water separator can be used alone or in addition to the water pump attached to the dredge nozzle to further aid in drawing a sediment laden mixed fluid stream into the oil-water separator for processing.

To improve processing of a sediment laden mixed fluid stream, in some embodiments, the distribution branches of the oil-water separator include a sluice box floor with riffles disposed therein to not only channel the mixed fluid stream into a given oil separation chamber, but to also separate, trap and recover heavier particles and minerals based differences in specific gravity such as gold, silver, lead and the like as the mixed fluid stream washes over the sluice box floor with riffles and into a given oil separation chamber. In general, the sluice box floor component is angled upward relative to horizontal at an angle of about 20 to 40 degrees, typically about 25 to 35 degrees, and more usually at about 28.5 degrees. More typically, a distribution branch with the sluice box floor component disposed therein is angled upward from the oil-water manifold at an angle of about 20 to 40 degrees, typically about 25 to 35 degrees, and more usually at about 28.5 degrees. In some embodiments, the distribution branch with the sluice box floor component disposed therein includes a trap below the sluice box floor to collect material passed through the sluice box floor.

The oil-water main, oil-water manifold and distribution branches can be composed of various materials, including, but not limited to, metal, plastic, rubber, composites and many other materials with the proviso the materials are sufficiently resistant to the materials to be processed, such as oil-resistant hose, pipe and the like.

In many embodiments, one or more of the oil-water main, oil-water manifold, and distribution branches are modular in that they can be coupled and decoupled for storage, reassembly, replacement and the like. For example, in some embodiments, the oil-water main is a flexible conduit, the oil-water manifold is inflexible material, the two are connected through a reversible coupler. In as many embodiments, the oil-water main is integral with the oil-water manifold, where the oil-water main includes a reversible coupler for attaching one or more extensions and/or accessories. In some embodiments, the oil-water main terminates to a oil-water collector head, such as a skimmer head where the mixed density fluid stream is collected and pooled, and the distribution branches are each individually connected to the oil-water collector head.

As summarized above, the first and second oil separation chambers each include upper and lower portions relative to horizontal joined through side walls and defining a substantially sealed enclosure for containing a fluid therein.

In certain embodiments, the oil separation chamber side walls taper upward from at least the horizontal midline towards the top to define a vertically narrowing oil recovery column therein. A featured embodiment is where the chambers are contained in the same housing. A specific aspect is where the chambers are contained in the same housing and share a common side wall forming a vertically extending middle wall separating the chambers, the upper portion of the housing narrowing upward to define a vertically narrowing oil recovery column in each chamber such that an axis of symmetry of the housing extends in a generally vertical direction. Such vertically narrowing constructs include a housing generally shaped as a pyramid, cone or other tapered geometric structure the base of which extends downward to define an extended lower portion with side wall dimensions similar to the base. Of course multiple other housing and internal chamber shapes are possible, and include, but are not limited to, regular and irregular shapes that provide upward narrowing oil recovery columns within the chambers.

For example, in some embodiments, the oil separation chamber side walls taper upward and downward from about the horizontal midline or waterline towards the top and bottom to define a bivertically narrowing oil recovery column in each chamber therein. For example, a housing containing chambers sharing a common side wall in the middle of the housing may include an upper portion narrowing upward and a lower portion narrowing downward to define an axis of symmetry that extends in a generally bivertical direction. Such bivertical constructs include a housing generally shaped as two pyramids or two cones sharing a common base or including a middle portion that connects the bases, such as a cube, cylinder, or other middle portion suitable for fluidly connecting the bases, such as a cylinder fitted with various conics on top and bottom. Here again, multiple other housing and internal chamber shapes are possible, and include, but are not limited to, regular and irregular shapes that provide the upward and downward narrowing oil recovery columns within the chambers.

In certain embodiments, the first and second oil-separation chambers have approximately equal enclosure volumes capable of processing approximately equal volumetric flow rates. In some embodiments, the first and second oil-separation chambers may optionally include one or more baffles or coalescers disposed therein to aid fluid separation. Baffles and the like, for example, can also reduce sloshing around of the fluids in the chambers. This is particularly useful when the system is placed in operation in choppy waters.

As with the oil-water main and manifold, the oil-separation chambers and housing can be composed of various materials, including metal, plastic, rubber, composites and many other materials with the proviso the materials are sufficiently resistant to the fluids to be processed, particularly oil-resistant sheet metal, alloys and the like, such as aluminum, corrosion resistant steel and the like. The oil-water separator chambers and/or housing are preferably constructed of rigid material(s) and framing such as metal. Aluminum materials are particularly sturdy, lightweight, and corrosion resistant. Plastics and the like can also be used since the head pressures and shear forces are readily manageable with this system. In many embodiments, the oil-water separator is modular in that one or more parts thereof can be assembled and disassembled for storage, reassembly, replacement and the like.

The oil-water separator preferably includes a buoyancy system. Various buoyancy systems such as buoyancy tanks, bladders, floats, pontoons and the like can also be employed to stabilize the apparatus, provided the buoyancy system is sufficient to float itself as well as the oil-separator under load. Of particular interest are pontoons placed on either side of the oil-separation chamber mounted with extension bars for added horizontal stability. The pontoons may include a ballast system for adjusting and maintaining the desired position of the above and below waterline components when in operation.

Turning now to specific aspects of the plumbing and control features of the oil-water separator, the first and second oil separation chambers each individually further include an oil water inlet, a water outlet, an oil outlet, an air inlet, and a valve system arranged to regulate the flow paths of the inlets and outlets. The first and second chambers also include a valve control system to coordinate the opening and closing of the valves of each valve system for each chamber to alternate distribution and processing of a single, common source mixed density fluid stream between the chambers in parallel.

The location and flow paths of the inlets and outlets for each of the first and second chambers is as follows. The oil-water inlet is located in a lower portion of a given chamber and receives a distribution branch from the oil-water main to define an oil-water flow path from the oil-water main into that chamber. The water outlet is located in a lower portion of a given chamber and defines a water flow path from inside to outside that chamber. The oil outlet of a given chamber is located in an upper portion of the chamber and defines an oil flow path from inside to outside that chamber. The air inlet of a given chamber is located in an upper portion of the chamber and defines an air flow path from outside to inside that chamber.

More specifically, the water outlet and the oil-water inlet are preferably located at or below horizontal midline of a given oil separation chamber, and the air inlet and oil outlet above the horizontal midline. In certain embodiments, the water outlet and the oil-water inlet are located below the waterline of a given chamber, and the air inlet and oil outlet above the waterline. In addition, the water outlet and oil-water inlet of a given chamber are typically separated at a distance sufficient to limit mixing of the flow paths, and usually on effectively opposite sides of the chamber floor. For example, a featured embodiment is where the oil-water inlet is located in the back, and the water outlet in the front of a given chamber relative to the longitudinal axis of symmetry of that chamber. The water outlet and the oil-water inlet may also be offset or in alignment relative to the longitudinal axis of symmetry in the associated chamber.

As described above, each of the first and second oil separation chambers includes a valve system. The valve system comprises a plurality of valves that are in fluid communication with, and regulate the flow paths of the oil-water inlet, the water outlet, the oil outlet, and the air inlet of a given oil separation chamber.

Generally, (i) the oil-water flow path is regulated by an oil-water inlet valve to direct a mixed density fluid stream, such as an oil-water mixture, from the oil-water main and into a given oil separation chamber when open and prevent backflow when closed; (ii) the water flow path is regulated by a water outlet valve to direct flow of heavier-than-oil fluids, such as water, out of the chamber when open and prevent backflow when closed; (iii) the oil flow path is regulated by an oil outlet valve to direct flow of lighter-than-water fluids, such as oil, out of the chamber when open and prevent backflow when closed; and (iv) the air flow path is regulated by an air inlet valve to direct air flow into the chamber when open and prevent backflow when closed.

Thus the flow paths of each oil separation chamber are regulated by an oil-water inlet valve, a water outlet valve, an oil outlet valve, and an air inlet valve. This includes the situation where one or more of these valves are shared between two or more oil separation chambers to regulate a flow path of each chamber with a single valve, e.g., the oil flow paths of each of the first and second oil separation chambers can be regulated by a single oil outlet valve shared by the chambers. In addition, it will be appreciated that valves can be fitted directly to an inlet or outlet, or indirectly through an adaptor, conduit, extension, manifold, relegated to a pump, or any other suitable mechanism, provided that the valves are in fluid communication with and regulate the flow paths thereof in a complementary fashion to achieve the desired fluid flow when the system is placed in operation.

Thus in certain embodiments, each inlet and/or outlet of a given oil separation chamber employs its own individual valve to regulate the flow paths thereof. In other embodiments, two or more oil separation chambers share one or more valves to regulate a common type of fluid flow. In many embodiments, the first and second oil separation chambers share one or more valves selected from (i) an oil-water inlet valve to regulate mixed density fluid flow between the chambers, (ii) a water outlet valve to regulate to regulate water flow between the chambers, (iii) an air inlet valve to regulate air flow between the chambers, (iv) an oil outlet valve to regulate oil flow between the chambers, or (v) a combination thereof.

Take air flow for instance. When the first and second chambers share a common air inlet valve to regulate the alternating distribution of air flow between the two chambers, the shared valve is generally one that opens air flow to the first chamber while at the same time it shuts off air flow to the other chamber. A two position, three way valve is an example of a valve that can be used to accomplish this.

Thus in many embodiments, one or more of the flow paths of the first and second oil separation chambers are consolidated through distribution branches of a manifold and into a main containing the combined flow. In as many embodiments, the manifold comprises a shared valve to regulate flow between distribution branches of the manifold and the main. In as many embodiments, the shared valve is at least a two position, three way valve.

Valves having at least two positions and at least three ways or ports allows control over at least two different flow paths to or from a common source. An advantage here is that a single valve can be used to simultaneously to open and close different flow paths. Another advantage is that the flow paths can be diverted into or from a common flow path. For example, a two position, three way valve allows oil to be drawn from the oil outlets of two different oil separation chambers and into a common oil main, but normally not at the same time when the valve is fully set to one or the other of its two valve positions OPEN or CLOSE.

A specific embodiment is where the air inlet valve is shared by the first and second chambers, and the air inlet valve is at least a two position, three way valve, and preferably at least a two position, three way valve that is actuator controlled. A featured aspect is where the air flow paths of the first and second oil separation chambers are consolidated through distribution branches of an air manifold and into a main air inlet, and the air manifold comprises the shared air inlet valve. Another specific embodiment is where the oil outlet valve is shared by the first and second oil separation chambers, and the shared oil outlet valve is at least a two position, three way actuator controlled valve. A featured aspect is where the oil flow paths of the first and second oil separation chambers are consolidated through distribution branches of an oil manifold and into a main oil outlet, and the oil manifold comprises the shared oil outlet valve.

So while the first and second oil separation chambers each individually have their own valve system to regulate fluid flow, the chambers can share one or more valves between valve systems so that one valve can be used instead of two to simplify and achieve the same purpose.

As described above, the valves of the valve system for each of the first and second oil separation chambers include first and second valve settings (a) and (b), respectively. The first valve setting (a) opens the oil-water flow path of the oil-water inlet and the oil flow path of the oil outlet, and closes the air flow path of the air inlet and the water flow path of the water outlet. The second valve setting (b) closes the oil-water flow path of the oil-water inlet and the oil flow path of the oil outlet, and opens the air flow path of the air inlet and the water flow path of the water outlet.

As also described above, opening and closing of the valves of the valve systems for the first and second chambers is controlled by a valve control system. In general, the valve control system is capable of alternating opposing valve settings (a) and (b) between the first and second oil separation chambers in parallel when the oil-water separator is placed in operation. For example, when placed in placed in normal operation, the apparatus is usually positioned in a body of water such that (i) the water flow paths outside of the chambers are in fluid communication with the body of water, (ii) the air flow paths outside of the chambers are in fluid communication with atmosphere, (iii) a mixed density fluid is supplied to the oil-water main, (iv) a partial vacuum is applied to the oil outlet of the chamber having the open oil flow path to withdraw fluid therefrom, and (v) air is supplied to the air inlet of the chamber having the open air flow path to supply air thereto. Thus, the valve control system is generally one that capable of alternating opposing valve settings (a) and (b) between the first and second oil separation chambers in parallel when (i) the apparatus is placed in a body of water to position the oil-water inlets and the water outlets below waterline, and the oil outlets and air inlets above waterline, (ii) a fluid stream is supplied to the oil-water main, (iii) a partial vacuum is applied to the oil outlet of the chamber having the open oil flow path to withdraw fluid therefrom, and (iv) air is supplied to the air inlet of the chamber having the open air flow path to supply air thereto.

The body of water in general can be an open body or tank of water, and can be a main and/or secondary source of the incoming fluid stream. For example, an open body or tank of water with lighter-than-water product on the water's surface can be a main source for the mixed density fluid stream when the apparatus employs a skimmer head attachment to supply the stream to the apparatus. In another example, an open body or tank of water can be a secondary source when used to supply water for cleaning contaminated sediment when the apparatus employs a dredge nozzle attachment.

In operation, as the valve settings are alternated, application of the partial vacuum is also alternated between the oil separation chambers such that it is only applied to the open oil outlet flow path of the chamber in valve setting (a), while at the same time, the air supply is alternated between the chambers such that it is only supplied to the open air inlet flow path of the chamber in valve setting (b). In addition, as the partial vacuum and air supply alternate in an opposing fashion between the chambers due to the alternating of opposing valve settings (a) and (b), so does the inflow of the mixed density fluid stream, which is only actively drawn into the chamber to which the vacuum source is applied.

This is accomplished in part as the partial vacuum is applied to the oil flow path downstream of the valve system regulating that path (i.e., downstream of the oil outlet valve, such that when the valve is open in valve setting (a), the partial vacuum is applied to the oil outlet and fluid can be withdrawn from the chamber through the oil outlet, but when the oil outlet valve closed in valve setting (b), the vacuum source is removed and no fluid is removed). Similarly, the air is supplied to the air flow path downstream of the valve system regulating that path (i.e., downstream of the air inlet valve, such that when the valve is open in valve setting (b), air is applied to the air inlet and air enters into the chamber through the air inlet, but when the air inlet valve closed in valve setting (a), the external air source is no longer available to the chamber).

As can be appreciated, many different types of valves and valve control systems can be chosen and arranged in a complimentary fashion to accomplish the desired valve settings and alternating control function. This includes the situation in which all of the valves of the oil-water separator are actuator controlled, or a combination of actuator and self-regulating fluid flow controlled. Moreover, as the actuator controlled valves include manual and power-operated valve actuators, depending of the valve types and arrangement employed, the valve control system can be manual, automated, or a combination thereof.

Self-regulating check valves that normally allow fluid to flow in one direction but not the other are examples of self-regulated fluid flow valves. Flap valves and float ball valves are specific examples, but generally include any other form of shut-off valve that self-regulates opening and closing in response to the direction the fluid is flowing or attempting to flow.

Valves controlled by power-operated valve actuators are numerous, as virtually all valve types can be adapted for power-operated actuation. For instance, power-operated valve actuators allow the associated valves to be adjusted remotely by a wide range of mechanisms, such as pneumatic, electronic, and hydraulic actuator mechanisms. Of particular interest are power-operated valve actuators capable of rapid opening and closing of an associated valve and that can be controlled by electrical means, such as by an electrical relay switch that directs the valve to open or close. Pneumatic valve actuators controlled by an electric coil or solenoid relay switch are an example. Power-operated valve actuators also provide for a wide range of commercially available external and/or integrated electronic control systems to manage the timing, conditions, and manner in which the valves are triggered to open and close, as well as the extent to which they open and close.

As such, the types of valves and valve control system are not intended to be limited to any particular combination, provided that the combination utilized in the oil-water separator is capable of establishing and alternating the desired opposing valve setting function between chambers when the apparatus is placed in operation.

Thus in one embodiment, the valve control system employs all actuator-controlled valves to collectively provide a valve control system and compliment of valves necessary to establish and alternate the desired valve settings. More typically, however, the valve control system utilizes a complimentary combination of one or more valve actuators and fluid flow itself to open and close the valves, where the one or more valve actuators control the opening and closing of one or more actuator controlled valves, and fluid flow controls the opening and closing of one or more self-regulating check valves.

For example, in certain embodiments, the oil-water inlet valve and the water outlet valve of a given oil separation chamber are self-regulating check valves, and the air inlet valve and the oil outlet valve are actuator controlled valves. In other embodiments, the oil outlet valve is shared between the oil separation chambers and controlled by a valve actuator, and the remaining oil-water inlet valves, air inlet valves, and water outlet valves are self-regulating check valves. In many embodiments, a first valve actuator controls an air inlet valve shared between the first and second chambers that is at least a two position, three way valve, and a second valve actuator controls an oil outlet valve shared between the first and second chambers that is at least a two position, three way valve. A specific embodiment is where (i) the oil-water inlet valve for each of the first and second oil separation chambers is a flap valve, (ii) the water outlet valve for each of the first and second oil separation chambers is a float ball valve, (iii) the air inlet valve is shared by the first and second oil separation chambers and the shared air inlet valve is at least a two position, three way actuator controlled valve, and (iv) the oil outlet valve is shared by the first and second oil separation chambers and the shared oil outlet valve is at least a two position, three way actuator controlled valve. As such, the valve control system in many embodiments employs at least one valve actuator, and more usually two valve actuators to control two actuator controlled valves, the remaining compliment of valves being self-regulated check valves controlled by fluid flow.

As described in greater detail herein, one or more sensors and/or timers and the like can be used to control the valve actuators. In certain embodiments, one or more of the valve actuators is in communication with one or more sensors to sense a fluid condition in the first and second chambers. In one embodiment, at least one valve actuator is in communication with at least one sensor to induce: (i) valve setting (a) for the first oil separation chamber when a first fluid condition is sensed, or valve setting (b) for the first oil separation chamber when a second fluid condition is sensed; and (ii) the opposing valve setting for the second oil separation chamber. In some embodiments, at least two valve actuators each individually in communication with first and second sensors are provided to induce: (i) valve setting (a) or (b) for the first oil separation chamber in response to sensing a fluid condition, and the opposing valve setting for the second oil separation chamber; and (ii) valve setting (a) or (b) for the second oil separation chamber in response to sensing a fluid condition, and the opposing valve setting for the first oil separation chamber. Fluid conditions of particular interest include oil level, oil content, water level, water content, and combinations thereof including phase boundaries.

Usually, the valves and the valve control system of the oil-water separator form an automated system combining valves that are self-regulated by fluid flow and valves that are controlled by power-operated valve actuators and a switch circuit in communication with the valve actuators to alternate valve settings. A specific embodiment is where the power-operated valve actuators are controlled by a switch circuit in communication with one or more sensors to provide automatic control over the valve settings.

Control over the operation of power-operated valve actuators are numerous, and include manual, hydraulic, pneumatic, electronic and other mechanisms. Electronic mechanisms are preferred. For electronic control, a switch circuit is provided. The switch circuit in general is an electrical circuit comprising one or more switches to provide operation commands directly or indirectly to the valve actuators and cause the actuators to move the associated valves in direction OPEN or CLOSE. A large number of possible switch circuits can be employed to provide the desired valve switching function.

Relay switch circuits are of specific interest. Relay switch circuits of particular interest include one or more relays (electrically operated switches) to operate one or more power-operated actuators, such as one or more power-operated actuators changed to OPEN or CLOSE by one or more electric coils or solenoids of the switch circuit. In some aspects, the relay switch circuit includes subcircuits each with one or more relays to coordinate control of the same and/or different power-operated actuators, and configured as open loop or closed loop systems. Closed-loop systems are of specific interest so as to provide automatic feedback control between one or more power-operated actuators. Closed loop systems with one or more sensors providing feedback to the switch circuit through a sensor switch in electrical communication with the switch circuit can be used for this purpose.

For example, a closed loop relay switch circuit with at least two subcircuits each having a sensor switch operating a relay to control the same power-operated actuator provides a mechanism to alternate the valve settings of that actuator dependent on sensor feedback to each subcircuit. The subcircuits can include additional relays to operate additional power-operated actuators in the same manner. In this way, two or more power-operated actuators can be coordinated by the relay switch circuit to operate two or more valves in an alternating fashion dependent on sensor feedback.

Of course switch circuits other than relay switch circuits can be used to achieve the same purpose, depending on the actuator chosen and its own given switch setup for transmitting the commands to the actuator. In addition, open loop switch circuits can be used, for example, when simple manual control of the valve switching is desired. Moreover, sensors can provide feedback through other mechanisms other than switch outputs directly to a sensor switch, such as through transmitting data via various mechanisms to a electronic controller unit in communication or integrated with the switch circuit to evaluate signals from the sensor and provide operational commands to the actuator.

Thus electronic control over the operation of power-operated valve actuators are numerous, which can include a simple manual switch circuit, or a switch circuit with or without sensor switches, with or without sensors, and the like depending on a given end preference. Moreover, the switch circuit can be in communication or integrated with a controller unit and the like. Thus the switch circuit is not intended to be limiting.

Nevertheless, when more robust control is desired, the switch circuit usually includes at least two subcircuits each controlling the same power-operated valve actuator to provide alternate control of the valve settings of that actuator. Here the switch circuit can be self-contained and/or or operated by an electronic controller unit, and be open loop or closed loop and with or without sensor switches or sensors.

Of particular interest is where the switch circuit is a closed loop switch circuit with at least two subcircuits each having a sensor switch in communication with a sensor with switch output, each subcircuit controlling the same power-operated valve actuator to provide alternate control of the valve settings of that actuator through sensor feedback. In some embodiments, each subcircuit controls two or more power-operated valve actuators. In certain embodiments, the switch circuit is a closed loop relay switch circuit with at least two subcircuits each having a sensor switch operating at least one relay controlling the same power-operated valve actuator. In some embodiments, the subcircuits each include a sensor switch operating at least two relays controlling the same power-operated valve actuator. Of particular interest is where the sensor switch is a normally open (NO) switch. A specific example is where the NO switch is a momentary NO microswitch in communication with one or more sensors and activated by float sensor limits to alternate opposing valve settings, such as exemplified in FIG. 3.

In general, sensor switches can be operated by process variables such as pressure, temperature, flow, current, voltage, and force, making them very useful to automatically control many different systems. Timers and the like can also be readily adapted to sensor switches. For example, sensors with switch output or sensor switches with timers can provide a variety of timed operations, such as delays and the like to adjust response times and reduce intermittent or false signals and so forth. Thus sensor switches are of particular interest as they can be provided in numerous switch contact arrangements common in switch circuits for actuators and sensors, such as manually or by some sensing element for fluid level, fluid content, pressure, temperature, flow and the like.

For instance, a float can be used both as a mechanical sensor to monitor the water and oil levels and as a switch initiator to trigger a sensor switch, such as a pressure sensor switch, such as a microswitch, the output of which is electrically connected to the switch circuit. In one example, when the pressure sensor switch is pressed by the float, the pressure sensor switch activates a subcircuit of the switch circuit that energizes its associated valve actuator(s) to open or close depending on the circuitry and valve system design chosen. To alternate valve settings between two oil separation chambers, for instance, two float initiated pressure sensor switches (one in one chamber and another in the other chamber) each in electrical communication with its own subcircuit can be electrically coordinated within a simple switch circuit or in communication with a controller as part of a larger switch circuit to power and alternate opposing valve actuator settings between the first and second oil separation chambers in parallel.

As described above, the switch circuit can be in communication with an external electronic controller unit or integrated as part of the controller unit as a whole. For example, many controller units are commercially available that can be programmed to provide the desired switch circuit function automatically. When combined with a sensor, the controller unit evaluates the signals from the sensors to determine the fluid condition and provide operational commands to the actuators to move the valves to the desired setting.

For example, a sensor with sensor switch such as s a liquid level sensor with switching function combined with a transmitter can be used to generate an electronic signal that is proportional to the level in a given oil separation chamber. The signal is received by a controller unit that operates other devices (e.g., valves, pumps), which, in turn, control the amount of product flowing in and out of a given oil separation chamber.

This includes wireless switch circuit systems. By way of example, a typical wireless liquid sensor control system generally includes: (i) a chamber mounted sensor containing transmitter and receiver crystals; (ii) a radio frequency (RF) sensor drive and detector electronic circuit, which may be integral with the sensor or mounted adjacent to the sensor depending upon chamber conditions or access considerations; and (iii) a controller unit mounted remotely to monitor the sensor state and provide the required operation commands to the valve actuators.

Controller units suitable for these purposes thus generally include input terminals for sensors and remote operation to allow and automate different valve control and sensor settings. The sensors and/or controller units may also include timer functions, alarms, diagnostics and the like.

A variety of sensors are available to monitor fluid conditions. This includes sensors capable of sensing changes in oil level, oil content, water level, water content, and combinations thereof including those for monitoring phase boundaries. Mechanical sensors, electrical conductivity sensors, acoustic sensors, vibrations sensors and optical sensors can be used for this purpose. An example of the mechanical sensor is a float sensor. A capacitance sensor is an example of the electrical conductivity sensor. Ultrasonic wave sensors and tuning fork sensors are examples of acoustic sensors and vibration sensors, respectively. An example of an optical sensor is a fluorescence sensor. The sensors can be employed alone or in various combinations and numbers for a given end use.

Liquid level sensors are of particular interest. For example, liquid level sensors with switch output such as float and point switches are common and relatively easy to use. Of specific interest are point level switches based on the vibrating tuning fork principle that are designed to detect low or high levels of liquids. The switch vibrates at a resonant frequency. When the tuning fork is submerged in the product, the frequency changes. This change is detected by an integrated oscillator and converted into a switching output.

Commercial sources for various switch circuits, controller units and fluid condition sensors include Omega, Rosemount, Foxboro-Eckardt, Barton Instruments, Emerson Process Management, Fisher, Masoneilan, Anderson Greenwood, DanUni Marine & Offshore A/S, and the like.

Thus in many embodiments, the valve control system includes one or more valve actuators in communication with a switch circuit, which may further include one or more sensors in communication with the switch circuit to sense a fluid condition. As noted above, sensors of specific interest are capable of sensing changes in oil level, oil content, water level, water content, or combinations thereof. Of specific interest is water level, oil level, or both. More typically the fluid condition sensed by the sensor is usually a predetermined fluid limit, such as a water level or content limit. Take water level for instance. When the water level reaches or exceeds a predetermined limit, the sensor communicates this information to the switch circuit which then provides the operation commands to the valve actuators.

Of particular interest is where the valve control system comprises one or more self-regulated check valves and one or more valve actuators in communication with a switch circuit and sensors for sensing a fluid condition to alternate opposing valve settings (a) and (b) between the first and second oil separation chambers.

As described above, the switch circuit is utilized to induce the valve actuators to reverse the valve settings of the actuator controlled valves in response to a fluid condition sensed in the first and second chambers by one or more sensors in communication with the switch circuit. In certain embodiments, the switch circuit induces first and second valve actuators. In many embodiments, each oil separation chamber includes a sensor switch in communication with the switch circuit.

In certain embodiments, the valve control system comprises a closed loop switch circuit in communication with one or more sensors and one or more valve actuators to automatically induce valve setting (a) of a given oil separation chamber when a sensor senses a first fluid condition (e.g., low water level, high oil level), or valve setting (b) of the chamber when a sensor senses a second fluid condition (e.g., high water level, low oil level). Operation of the closed loop switch circuit induces the valve settings of both chambers to reverse when the fluid condition changes from the first fluid condition to the second fluid condition, and vice versa to alternate the valve settings and continue the cycle.

In certain embodiments, the first and second oil separation chambers each individually comprise a sensor in communication with a sensor switch. In many embodiments, each sensor switch is in communication with an actuator-controlled air inlet valve and an actuator-controlled oil outlet valve.

In certain embodiments, the switch circuit comprises first and second subcircuits each individually comprising a sensor switch in electrical communication with first and second valve actuators, the first valve actuator controlling an air inlet valve shared between the first and second oil separation chambers, the second valve actuator controlling an oil outlet valve shared between the first and second oil separation chambers, the sensor switches in communication with the one or more sensors to monitor a fluid condition in a given oil separation chamber. Here the first and second valve actuators concurrently induce: (i) valve setting (a) or (b) in one of the first or second oil separation chambers when the sensor switch is initiated by a sensor, and (ii) the opposing valve setting for the other oil separation chamber.

A featured aspect is where the first and second oil separation chambers each individually comprise a sensor in communication with a sensor switch, and where (i) the actuator-controlled air inlet valve is shared by the first and second oil separation chambers and is at least a two position, three way actuator-controlled valve in valve setting (a) for the first chamber and valve setting (b) for the second chamber, (ii) the actuator-controlled oil outlet valve is shared by the first and second oil separation chambers and is at least a two position, three way actuator-controlled valve in valve setting (b) for the first chamber and valve setting (a) for the second chamber, and (iii) each sensor switch when triggered is capable of inducing the shared actuator-controlled air inlet valve and the shared actuator-controlled oil outlet valve to move to the opposing valve setting (a) or (b) in response to changes in the fluid condition sensed and communicated to the sensor switch.

In many embodiments, the switch circuit comprises first and second subcircuits for each of the first and second oil separation chambers, the first and second subcircuits in communication with one or more sensors having one or more sensor states to monitor a fluid condition in a given oil separation chamber, the first and second subcircuits in electrical communication with one or more valve actuators to induce valve setting (a) or (b) in one of the first or second oil separation chambers chamber, and the opposing valve setting in the other chamber, and a controller unit to monitor the sensor state and provide the operation commands to alternate opposing valve settings (a) and (b) between the first and second oil separation chambers. In one embodiment, the first subcircuit is in electrical communication with one or more valve actuators to induce valve setting (a), and the second subcircuit in electrical communication with one or more valve actuators to induce valve setting (b).

As described above, when the oil-water separator of the present disclosure is placed in normal operation, a partial vacuum is applied to the oil flow path outside of a given oil separation chamber to facilitate inflow and withdrawal of the oil therefrom when the oil flow path of that chamber is open. One or more pumps can be used to achieve this. For example, when the oil outlet valve is shared between two chambers, only a single pump is necessary. When not shared, two pumps can be used for this setup. Thus in many embodiments, the oil separator as a system further includes a pump, such as a suction or vacuum pump. The oil-water separator system may further include a storage tank or liquid trap to collect off load product that the pump removes from the oil-water separator. For example, a liquid trap setup can be used to capture the separated product such as oil that the pump removes from the chambers. In one embodiment, the liquid trap is in fluid communication with the oil flow path and disposed downstream of the oil outlet and upstream of the pump.

Pumps for applying the partial vacuum of particular interest include those in which the volumetric flow rate induced by the pump at the oil outlet approximates that of the oil-water main that feeds the oil separation chambers. For example, when operating a vacuum or suction pump to draw fluid into the oil-water main and through the system for discharge, it is desirable to balance the amount of vacuum (or degree of evacuation) to achieve the desired flow rate across the oil-water separator system. This aids in managing turbulence as well as other features associated with pipe length and volume, chamber height and volumes, pumping power and position, the hydraulic head, bends, fittings, valves, etc. For dredge nozzle applications, the system will generally include a water pump.

The oil-water separator may further include one or more flow controller units to achieve the desired flow. Generally, the controller unit compares a setpoint to a fluid flow condition process variable whose value is provided or transmitted by sensors that monitor flow changes to manage load disturbance, such as volumetric flow rate, liquid levels, turbulence, temperature, pressure, fluid composition and the like. Use of a controller unit to control a pump to coordinate the suction at the oil outlet with inflow from the oil-water main is an example. Another example is a controller unit to manage flow the actuator controlled valves controlling the flow paths of the inlets and outlets such that one or more of the valves may further include additional settings, such as partially open or partially closed to adjust fluid flow through the system in operation, or for maintenance, calibration, and the like. A specific example is use of a controller unit to manage the pump system and one or more the valve actuators in response to signals received by one or more sensors of the oil-separator system.

As can be appreciated, the oil-water separator may further include one or more additional chambers. For example, the oil-water separator may further include one or more additional distribution branches feeding one or more additional oil separation chambers. Here the valve control system can be readily adapted in a manner to provide alternating opposing valve settings (a) and (b) between the first, second and the one or more additional oil separation chambers. Other examples include modular constructs, such as dual chamber systems assembled and/or deployed as pairs and so forth.

Thus the oil-water separator can be adapted in multiple configurations and for multiple different uses, including rapid deployment cleanup kits that are sufficiently lightweight and compact for transport by a wide range of vehicles. Smaller and larger versions are possible, as the system is readily scalable.

Referring to the drawings, as detailed below and in FIGS. 1 through 5, an exemplary oil-water separator with a skimmer head attached for lighter-than-water slick recovery is illustrated. It will be appreciated, however, that the design of the exemplified embodiments are applicable to other devices, systems and methods and not intended to be limiting. Referring to the drawings in detail, wherein like numbers designate like parts, several features are illustrated.

Turning initially to FIG. 1, depicted is a transparent side view of an exemplary towable oil-water skimmer apparatus 13. The skimmer as shown consists of oil-water separator 1 joined through oil-water main 2 to skimmer head 9. Waterline 10 is shown for reference to normally submerged and above-water components when under operation. Dimension 12 is equal to 1 foot in this example. The skimmer head with oil-water main inlet 11 is operably connected to, such as through a coupler, and in fluid communication with the oil-water main, which is capable of feeding a mixed density fluid stream into different chambers of the oil-water separator, each chamber including an oil-water inlet coordinately regulated in part by flap check valve 3, oil-outlet fitting 4, air inlet fitting 5, a water outlet float ball check valve 6, and float switch 8. Note here that oil-outlet fitting 4 and air inlet fitting 5 are unobstructed passages that each provide coupling outside of the chambers, for example, to a two position, three way pneumatically actuated valve (not shown) to regulate oil flow out and air flow in. In this example, a vacuum pump is attached though a hose to the common port of a two position, three way pneumatically actuated valve and the other two ports to the two the oil outlet fittings 4 of both chambers; similarly, hose open to atmosphere is attached though a hose to the common port of a two position, three way pneumatically actuated valve and the other two ports to the two the air inlet fittings 5 of both chambers. Various boom systems (not shown) can be attached to the skimmer head to corral, concentrate and feed the skimmer head a mixed density fluid stream. Various buoyancy systems (not shown) can also be employed to stabilize the apparatus.

FIGS. 2A-2D depicts oil-water separator 1 in more detail. FIG. 2A illustrates a transparent side view of the oil-water separator. FIG. 2B depicts a top down view of the oil-water separator. FIG. 2C depicts a partially transparent bottom-up view of the oil-water separator. FIG. 2D depicts oil-water main 2 feeding oil-water manifold 14 bifurcating into first and second distribution branches 15.

As shown in FIGS. 2A-2D, exterior side walls 16, bottom plate 17 and top plate 18 are joined to form a fluidly sealed housing having two oil-separation chambers 19 and 20 disposed therein. The oil-separation chambers are formed within the housing by a commonly shared, vertically disposed middle side wall 23 such that an axis of symmetry extends in a generally vertical direction. Also note that the housing's exterior side walls 16 are arranged in a generally pyramidal shape, the pyramid extending upward from its downward extending base at the bottom plate and intersecting the top plate to form a vertically narrowing oil-recovery column in each oil separation chamber therein.

Oil-separation chambers 19 and 20 each include an oil outlet 21 and an air inlet 22. Each oil outlet and air inlet forms a fluidly sealed passage through the top plate to fluidly connect the inside of their associated chamber to the outside that chamber. Similarly, oil-water inlet 24 and water outlet 25 each individually form a fluidly sealed passage through the bottom plate to fluidly connect the inside of the associated chamber to the outside that chamber. The oil outlet and air inlet are shown as above-waterline components, whereas the oil-water inlet and water outlet in this example are generally below waterline when the apparatus is in operation.

As also shown in FIGS. 2A-2D, oil-water main 2 and distribution branches 15 with bend angles 26 and 27 of thirty degrees or less define a low turbulence oil-water flow path into each oil-separation chamber. Each oil-water flow path proceeds from outside to inside a given oil-separation chamber through the oil-water inlet. Each oil-water inlet is regulated by a flap check valve 3. Flap check valve 3 with hinge 28 is shown in the closed position. The flap valve opens up into its associated chamber when fluid is drawn from the distribution branch and into that chamber. The flap valve returns to the closed position to prevent backflow when fluid flow from the distribution branch is stopped.

Each water outlet 25 is regulated by tubular shaped, float ball check valve 6. Each float ball check valve is fitted to and through the water outlet in the bottom plate of the chamber, defining a water flow path from inside to outside the chamber. The water outlet is open to fluid flow when float ball 29 rests at the bottom of the tubular assembly on a horizontally disposed float ball retaining rod 30 as shown. The water outlet is closed when the float ball is drawn up into the float ball seat 31, which seals off the semicircle vent hole 32 of the float ball seat.

In operation, water flows out of the chamber when oil-water inlet 24 and oil outlet 21 are closed, and air inlet 22 and the water flow path through water outlet 25 and the semicircle vent hole 32 of float ball seat 31 are open. When air inlet 22 is closed and a partial vacuum is applied to draw fluid out of oil outlet 21 of that chamber, the partial vacuum also imparts suction to the in-chamber portion of the float ball check valve tube assembly. The suction causes the float ball to be drawn up into the float ball tube assembly. As the float ball continues to rise in the tube under suction, it eventually seats into the float ball seat and restricts water flow out the chamber by sealing off the semicircle vent hole. At the same time, suction applied outside of the chamber to oil outlet 21 also causes the mixed density fluid stream from the oil-water main to be drawn into the oil separation chamber through oil-water inlet 24 and the opening of flap check valve 3. The flap valve further serves as a diffuser to calm the incoming fluid stream, helping fluids of different densities to further separate.

As noted above, FIGS. 2A-2D shows the oil-water separator installed with two float switches 8, one for each oil-separation chamber. Operation of each float switch is controlled by the upward or downward movement of a float tube 33 placed in the chamber in a guide tube 34. The guide tube is vertically perforated with holes 7 for pressure equalization. The elongated float tube is designed to penetrate viscous material such as oil. It is also hollow and designed to be less dense than water, but more dense than oil. Due to the higher density of the water, the float tube moves reliably along with the water level in the guide tube and sinks in oil. When the water level rises above a certain level, the float causes lever arm assembly 35 to engage push button 36 of pressure sensor switch 37.

The pressure sensor switch 37 depicted in FIGS. 2A-2D is a single pole double throw (SPDT) normally open (NO) momentary microswitch, so that the subcircuit controlling the valve actuators is connected when the float tube rises in the guide tube and engages the lever arm to complete and energize the subcircuit associated with that switch. Activation of the pressure sensor switch reverses the valve settings of both chambers, causing the chamber filled with too much water to open the air inlet flow path and close the oil outlet flow path, causing water in that chamber to fall in the oil recovery column and immediately discharge through the water outlet float ball valve in the bottom while closing the oil-water inlet flap valve to close. In addition, water discharge from the chamber causes the float tube to disengage its switch. Because the microswitch contacted by the float tube is a momentary switch, it automatically resets to the normally open position, immediately turning off the circuit. At the same time, as the other chamber's valve settings are now changed to close the air inlet flow path and open the oil outlet flow path, it actively removes oil until it eventually accumulates water to a threshold level such that float switch reverses the valve settings of both chambers once again. This cycle repeats so that the process is continuous and controlled automatically.

Referring to FIG. 3, the figure illustrates a simple closed loop relay switch circuit 39 with pressure sensor switches 37 to automatically control fluid flow of the exemplary oil-water separator depicted in FIG. 1. Briefly, the figure depicts a switch circuit with two subcircuits 40 and 41 each having a pressure sensor switch 37 operating two relays per subcircuit to direct opposite valve positions of the same two actuator controlled valves 42 and 43. This arrangement provides an automatic mechanism to alternate the valve settings of each actuator controlled valve dependent on sensor feedback to each subcircuit through a sensor switch.

More specifically, relays 44 and 45 are part of subcircuit 40. Relays 46 and 47 are part of subcircuit 41. Thus, each subcircuit includes a pressure sensor switch 37 operating two relays: the first relay controls air inlet valve 42 shared between the two oil-separation chambers, and the second relay controls an oil outlet valve 43 shared between the two oil-separation chambers. Each of the shared valves 42 and 43 is a two position, three way (2P/3W) pneumatically actuated directional control valve with solenoid switch, i.e., a relay. Each relay when energized induces the associated 2P/3W pneumatically actuated valve to OPEN or CLOSE.

Note that both subcircuits each individually control the same air inlet valve 42 and the same oil outlet valve 43. Also note that each subcircuit is normally open and controlled by its own pressure sensor switch 37. So when one pressure sensor switch is triggered, it activates its subcircuit to simultaneously direct the shared air inlet valve 42 and the shared oil outlet valve 43 to OPEN or CLOSE, depending on the valve's previous position. Because pressure sensor switch 37 is a momentary switch, it automatically resets to the normally open position, deactivating that subcircuit so that both subcircuits are open.

As arranged in FIG. 3, the initial valve positions of the shared air inlet valve 42 and the shared oil outlet valve 43 are set to opposite positions for a given oil-separation chamber. For one chamber, the initial position of the shared oil outlet valve 43 is set to OPEN and the position of the shared air inlet valve 42 is set to CLOSE. For the other chamber, the initial position of the shared oil outlet valve 43 is set to CLOSE and the position of the shared air inlet valve 42 is set to OPEN. Placing the actuated valves of one chamber set to OIL OPEN/AIR CLOSE, and the other to AIR OPEN/OIL CLOSE, prepares the apparatus for operation.

For example, in operation to separate oil and water, when the oil levels in the OIL OPEN/AIR CLOSE chamber are high, the float tube sensor detects this condition by sinking due to it being heavier than the oil in that chamber as noted above. When the float tube rises to its threshold limit due to water accumulating in the OIL OPEN/AIR CLOSE chamber, the pressure sensor switch is triggered, energizing its subcircuit and simultaneously moving the valves of this chamber to AIR OPEN/OIL CLOSE and the other chamber's valves to OIL OPEN/AIR CLOSE. As illustrated, together with the self-regulating check valves which limit flow in one direction, the switch circuit and the actuator controlled valves provides valve control system to automatically alternate the valve settings (a) and (b) between the chambers according to changes in the water and oil levels detected in each chamber.

Referring to FIGS. 4A-4D, the figure illustrates a skimmer head attachment of the exemplary oil-water separator depicted in FIG. 1. The skimmer head 9 includes oil-water main inlet 11, mouth 48, and water drain 49. Waterline 10 depicts the approximate point on the surface of the skimmer head that corresponds with the fluid inflow's surface when the apparatus is placed under normal operation. As illustrated, the skimmer head mouth 48 and water drain 49 are arranged to provide a horizontally elongated open face on the skimmer head's upstream side for receiving a fluid stream and an open internal chamber on the inside forming a channel to the drain on its downstream side to discharge water that is received by the mouth. The horizontally elongated mouth 48 is positioned to include above and below waterline portions. The water drain 49 is vertically elongated and positioned below waterline.

Generally, the skimmer head housing includes top, bottom and side walls that converge to a cylindrically shaped portion 52 on the downstream side of the skimmer head. The mouth 48 is defined by the upstream portion of the top, bottom and side walls. The side and bottom walls forming the mouth converge downwardly towards cylindrically shaped portion 52 to provide a converging and downwardly sloped throat. This converging and downwardly sloped throat of skimmer head 9 provides a configuration that naturally directs the fluid flow below waterline and the oil-water interface downwardly from the mouth and out of the water drain, while lighter-than-water product such as oil remains pooled on the surface within the skimmer head housing.

A more detailed look at FIG. 4A shows a transparent side view of skimmer head 9. FIG. 4B shows an opaque front view of the skimmer head. FIG. 4C depicts an opaque top down view of the skimmer head. FIG. 4D depicts an opaque rear view of the skimmer head, with mouth 48 height 50 as being twelve inches in this example to provide approximately six inches of the mouth above waterline and six inches below waterline. Mouth 48 is dimensionally shaped with above and below water portions for receiving an incoming fluid stream at waterline 10 from an upstream source, such as oil and water. The mouth includes an internal channel along a longitudinal axis and defining an internal channel for channeling a fluid flow therein. Note in FIG. 4A that the oil-water main 2 enters into the skimmer head through water drain 49 in the curved back wall, well below waterline. See also the broken line boxes in FIGS. 4B and 4D depicting entry point of the oil-water main 2 through water drain 49 and up into the skimmer head chamber. A coupler (not shown) is outside of the skimmer head for attaching and extending oil-water main 2 from the oil-water separator to the skimmer head.

As illustrated in FIGS. 4A-4D, the walls of the skimmer head converge downstream into a curved back wall forming a cylindrically shaped chamber 52. This convergence forms a channel from mouth 48 capable of directing more dense fluids such as water in a tangential manner from the mouth downstream and out through water drain 49. Cylindrical shape feature 52 in this example has a six inch radius (or twelve inch diameter) as shown in FIG. 4C. Note that the water drain 49 on the downstream curved back wall of the cylinder at its base 53 in this example is twelve inches as shown in FIG. 4D. Thus the height of mouth 48, the diameter of the cylindrical shape feature 52, and the downstream curved back wall of the cylinder at its base 53 are approximately equal to maintain the desired fluid flow.

As also shown in FIG. 4D, the oil-water main 2 extension is received into the skimmer head at an upward bend angle of about thirty degrees or less such that the skimmer head oil-water inlet forms horizontally elongated and elliptically shaped oil-water drain, the surface of which is horizontally disposed just below waterline. A further shown, water drain 49 is formed by a vertically elongated opening in the cylindrically shaped or inwardly curved back wall. The drain is typically vertically agonic as well in that at least the sides and top of the drain are curved, for example, as shown in FIG. 4D. Specifically, water drain 49 is vertically agonic and elongated and possess an opening that is shaped somewhat like a parabola or hyperbola, with the vertex defining the top of the drain relative to waterline 10, and the base 53 of the opening being defined by the floor of the cylindrical portion of the skimmer head.

Note that the top of water drain 49 is positioned below waterline and the oil-water main inlet 11 of the oil-water main 2. Another feature of water drain 49 is that it is tilted at an acute angle towards its discharge area. Along with the contour of the opening and its position, this angle can be adjusted to alter shape parameters and other properties of the fluid flow for a given end use.

As further illustrated in FIGS. 4A-4D, the configuration of water drain 49 facilitates the longitudinal channeling of the fluid stream received by the mouth tangentially downward and out through water drain 49 as a rotating fluid stream to continually allow the water discharge, while leaving lighter-than-water product pooled on the water's surface within the skimmer head.

The figures show that the horizontal top and downwardly sloped floor of the skimmer head are tapered to narrow in the direction of fluid inflow, whereas the side walls thereof are tapered to narrow upward from the cylindrical shape feature 52 towards the direction of the mouth 48. As can be seen, the channel formed by the walls of the skimmer head defines a channel from a floor beginning at mouth 48 that longitudinally tapers and slopes downward towards water drain 49.

Also note in FIG. 4B that the base of the front of the cylindrical portion and the descending tapered mouth floor intersect. Here the base is shaped like a cylindrical wedge with the high side of the wedge facing upstream, with cylindrical chamber having water drain 49 on its downstream side defining the base of such cylindrical wedge.

Turning now to FIGS. 5A-5H, the figure illustrates fluid flow of the exemplary oil-water separator portion of the oil-water separator skimmer system 1 depicted in FIG. 1 when the apparatus is placed in normal operation in a body of water contaminated with a lighter-than-water product slick. Lighter-than-water contaminants such as oil are depicted by the black arrows (➡), the heavier fluids including water are depicted by the gray arrows (⇒) and air flow is depicted by the arrows with no fill (⇨).

Several components of the oil-water separator as a skimmer system are not shown in FIGS. 5A-5H, such as the specific valve and valve control systems, as the figure is provided to simply illustrate fluid flow when the flow paths are opened or closed by the valve and valve control systems. Also not shown is the skimmer head attachment 9 feeding oil-water main 2 with the contaminated fluid stream. Also not shown are the buoyancy members, or pump attached applying a partial vacuum to the oil flow paths outside of the oil-water separator housing at oil outlet 21 to withdraw fluid into and from a given chamber.

Generally, FIGS. 5A-5D show different views of the exemplary oil-water separator in a first processing cycle, and FIGS. 5E-5H show the same perspective views of the oil-water separator in a second processing cycle when the opposing valve settings are reversed. Note the fluid flow as the oil-water separator alternates opposing valve settings between the first 55 and second 56 oil separation chambers, referred to herein for illustrative purposes only as chamber "C1" and chamber "C2," respectively. Here the two oil-separation chambers C1 and C2 operating in opposing but synergistic separation modes in parallel can be clearly seen. Also note the unobstructed low turbulence flow paths from the oil-water main through the oil-water manifold and into the distribution branches and oil separation chambers.

As described above and depicted in FIGS. 5A-5H, valve setting (a) is where the flow paths of oil-water inlet 24 and oil outlet 21 are open, while that of the air inlet 22 and water outlet 25 are closed. In contrast, valve setting (b) is where the flow paths of oil-water inlet 24 and oil outlet 21 are closed, while that of the air inlet 22 and water outlet 25 are open.

Specifically, FIGS. 5A-5D show the oil-water separator in a first cycle in which chamber C1 is in valve setting (a) while chamber C2 is in opposing valve setting (b), and FIGS. 5E-5H show the same perspective views of the oil-water separator operating when the valve settings are switched to a second cycle so that chamber C1 is now in valve setting (b) while chamber C2 is in valve setting (a).

More specifically, FIGS. 5A and 5E show a partially transparent side view of chamber C1 of the oil-water separator cycling back and forth between valve setting (a) in FIG. 5A and valve setting (b) in FIG. 5E. In parallel with the operation of chamber C1, FIGS. 5D and 5H show a partially transparent side view of chamber C2 of the oil-water separator cycling back and forth between valve setting (b) in FIG. 5D and valve setting (a) in FIG. 5H.

FIGS. 5B and 5F show a partially transparent bottom up view of chamber C1 cycling back and forth between valve setting (a) in FIG. 5B and valve setting (b) in FIG. 5F, and chamber C2 in parallel cycling back and forth between valve setting (b) in FIG. 5B and valve setting (a) in FIG. 5F. Similarly, FIGS. 5C and 5G show a partially transparent top down view of chamber C1 cycling back and forth between valve setting (a) in FIG. 5C and valve setting (b) in FIG. 5G, and chamber C2 cycling back and forth between valve setting (b) in FIG. 5C and valve setting (a) in FIG. 5G.

Kits & Deployment Systems

Also provided are kits and deployment systems comprising a mixed fluid separator of the disclosure that benefits by and/or finds use in practicing the subject methods, as described above. For example, kits and deployment systems that include a mixed fluid separator for practicing the subject methods may comprise one or more additional components, such as booms, hose, pump, holding tanks or other reservoirs. The kits may also include a system that includes disassembled and/or ready-to-use pre-assembled components. Of particular interest is a kit containing the oil-separator apparatus illustrated in the Figures.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., a diskette, a CD, etc., on which the information has been recorded. Yet another means that may be present is a website address which may be used via the internet to access the information at a remote site. Any convenient means may be present in the kits.

The term "deployable system" as employed herein refers to a collection of components of a system of the disclosure, particularly as the mixed fluid separator apparatus and systems are described herein and depicted in the Figures. Thus portions of the mixed fluid separator apparatus that are brought together for the purpose of practicing the subject methods are included.

Utility and Advantages

The subject oil-water separator, kits and methods find use in different applications, including removing contaminants from water and even contaminated sediments. The subject disclosure has broad applicability for separating fluids of different densities, particularly floatable surface contaminants in a body of water such as from ponds, streams, rivers, lakes, bays, open ocean and the like. It can also be used to clean shorelines thereof and other shallow water environments, for example, either with a skimmer head or dredge nozzle attachment for near shore skimming or on shore sediment cleaning. This includes when deployed in conjunction with one or more vessels when under a tow force imparted by a vessel to feed contaminated water to the apparatus, as well as in anchored settings when fed by current, or in even in a tank of fluid, for example, by placing the apparatus in a tank of water.

In-tank applications allow the oil-water separator to be deployed independent of being placed directly into an open water environment, including on dry land. This aspect has multiple applications on its own. For example, the oil-water separator with skimmer head attachment can be placed in a slop tank containing oily-water or other mixed density fluids such that when operated, product can be removed continuously until mostly only water remains. Other applications are where the oil-water separator is placed in a tank with water and the skimmer head or other attachment is placed outside of the tank to collect the material to be processed.

A specific in-tank example is an application where the oil-water separator is placed in a tank of water and the oil-water main is coupled through hose to the dredge head attachment. A vacuum or other suitable pump applies a sufficient vacuum to alternatingly draw fluid from the oil-water separator chambers into a recovery tank while a water pump pumps water from the water tank to the dredge nozzle to draw in and process contaminated material from outside the water tank, such as from an exposed shoreline, a slurry or containment pond, a mass of contaminated dirt or sand, and many other solid and liquid waste settings. In this way the water tank supplies the water to the dredge nozzle and is continuously recycled, while the contamination source is processed.

As can be appreciated, the oil-water separator of the present disclosure can be operated when placed in practically any liquid environment, whether the liquid is contaminated with oil or otherwise, in which it is desirable or useful. It is also contemplated that the water outlets of the apparatus can be attached through hose or pipe to collect the fluid discharged from these outlets such that the apparatus housing itself does not require being placed directly into any liquid. Thus while the oil-water separator is particularly useful for separating oil and water in oil-spill scenarios, the apparatus can be adapted for multiple other applications, including, but not limited to, the processing of liquids and sediments not contaminated with oil.

The subject oil-water separator, kits and methods have several advantages. The attendant benefits are particularly apparent for removal of oil from the surface of water.

One advantage is that the oil-water separator is capable of excellent product recovery efficiencies, e.g., recovering significantly more oil than water, even in choppy water environments. Another is that very good separation rates are possible through continuous flow. The continuous flow mode capabilities of the present oil-water separator permits a single or common incoming mixed density fluid stream source to flow continuously at a given volumetric inflow rate, while facilitating separation and discharge of the separated fluids at approximately the same volumetric outflow rate.

The oil-water separator also provides simplification of plumbing and convenience in operation. Where desirable, valve actuators, check valves, ports, stops and the like can be arranged to permit the required operating connections, and fluid sensors and controller systems can be employed for manual, automatic, or a combination of manual and automatic modes of operation. Also, more than two chambers can be exploited in parallel to increase, for instance, the oil-water separation and residence times in the passive mode chambers, to increase capacity in a modular fashion, and so forth.

Still a further advantage is that various fluid collector devices, such as oil spill containment boom systems, oil skimmer heads, dredge nozzles and the like, can be readily connected to the oil-water separator of the present disclosure. This aspect allows the separator to be adapted in many different settings and applications, as noted above, including in-tank as well as towed or anchored boom systems to corral, concentrate and recover lighter-than-water product slicks. The oil-water separator is especially useful in tidal areas, including tidally exposed shores, shallow water and costal environments in general.

Another important advantage of the present oil-water separator is that it can be readily adapted for use as a rapid response oil recovery system. For example, a portable kit with the oil-separator as illustrated in the figures can be readily fit into a standard commercial "fish tote." This "fish tote size oil-separator system" also works with many off-the-shelf skimmer head and boom systems. For example, when combined with standard near shore two foot deep floating vinyl-coated oil containment booms and accessories, the entire system weighs less than 600 pounds and can fit into a helicopter. This includes the option of including a regular four to six inch viscous fluid vacuum pump and 48 inch oil containment tanks for offloading and transport or otherwise if desired. This makes possible rapid deployment in remote locations where access to ports is limited or altogether absent.

From an oil spill clean-up perspective, the fish tote size oil-separator system can process 200 gallons of fluid per minute when towed at two knots. This also means that processing of the most common type of unwanted product spills, namely, those involving 1,000 gallons or less, can be accommodated with a very low upfront response cost.

Moreover, each component in and of itself is easily replaced if damaged, and is relatively inexpensive and straightforward to produce. Also, the size of the forward containment boom portion can be readily expanded by adding additional panels for larger sweeps.

As such, the subject disclosure finds use in a variety of different applications and represents a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

While preferred and alternate embodiments of the invention have been illustrated and described, as noted above, many changes can be made without departing from the spirit and scope of the appended claims. Accordingly, the scope of the invention is not limited by the disclosure of these preferred and alternate embodiments.

What is claimed is:

1. An oil-water separator comprising:
an oil-water main feeding an oil-water manifold having a first distribution branch feeding a first oil separation chamber, and a second distribution branch feeding a second oil separation chamber, the oil separation chambers each individually comprising as components:
  (i) upper and lower portions relative to horizontal joined through side walls and defining a substantially sealed enclosure for containing a fluid therein;
  (ii) an oil-water inlet located in a lower portion of the chamber and receiving a distribution branch from the oil-water main to define an oil-water flow path from the oil-water main into the chamber;
  (iii) a water outlet located in a lower portion of the chamber and defining a water flow path from inside to outside the chamber;
  (iv) an oil outlet located in an upper portion of the chamber and defining an oil flow path from inside to outside the chamber;
  (v) an air inlet located in an upper portion of the chamber and defining an air flow path from outside to inside the chamber; and
  (vi) a valve system comprising valves in fluid communication with and regulating the flow paths of the oil-water inlet, the water outlet, the oil outlet, and the air inlet, the valve system having first and second valve settings,
  the first valve setting (a) to open the oil-water flow path of the oil-water inlet and the oil flow path of the oil outlet, and to close the air flow path of the air inlet and the water flow path of the water outlet, and
  the second valve setting (b) to close the oil-water flow path of the oil-water inlet and the oil flow path of the oil outlet, and to open the air flow path of the air inlet and the water flow path of the water outlet; and a valve control system to alternate opposing valve settings (a) and (b) between the first and second oil separation chambers.

2. The oil-water separator of claim 1, wherein:
the oil-water flow path is regulated by an oil-water inlet valve to direct a mixed density fluid stream from the oil-water main into the chamber when open and prevent backflow when closed;
the water flow path is regulated by a water outlet valve to direct flow of heavier-than-oil fluids, such as water, out of the chamber when open and prevent backflow when closed;
the oil flow path is regulated by an oil outlet valve to direct flow of lighter-than-water fluids, such as oil, out of the chamber when open and prevent backflow when closed;
the air flow path is regulated by an air inlet valve to direct air flow into the chamber when open and prevent backflow when closed; and
the first valve setting (a) to open the oil-water inlet valve and the oil outlet valve, and to close the air inlet valve and the water outlet valve, and the second valve setting (b) to close the oil-water inlet valve and the oil outlet valve, and to open the air inlet valve and the water outlet valve.

3. The oil-water separator of claim 2, wherein the lower portion is at or below waterline, and the upper portion is above waterline.

4. The oil-water separator of claim 1, wherein the valve control system comprises one or more valve actuators and fluid flow to open and close the valves.

5. The oil-water separator of claim 4, wherein the one or more valve actuators are in communication with one or more sensors to sense a fluid condition in the first and second chambers, the one or more valve actuators inducing one or more actuator controlled valves to alternate opposing valve settings (a) and (b) in response to the fluid condition.

6. The oil-water separator of claim 5, wherein the fluid condition is selected from the group consisting of oil level, water level, and combinations thereof.

7. The oil-water separator of claim 4, wherein the oil-water inlet valve and the water outlet valve are self-regulated check valves, and the air inlet valve and the oil outlet valve are actuator controlled valves.

8. The oil-water separator of claim 7, wherein the oil-water inlet check valve is a flap valve, and the water outlet check valve is a float ball valve.

9. The oil-water separator of claim 7, wherein the air inlet valve is shared by the first and second oil separation chambers, and the shared air inlet valve is at least a two position, three way actuator controlled valve.

10. The oil-water separator of claim 9, wherein the air flow paths of the first and second oil separation chambers are consolidated through an air manifold into a main air outlet, and the air manifold comprises the shared air outlet valve.

11. The oil-water separator of claim 7, wherein the oil outlet valve is shared by the first and second oil separation chambers, and the shared oil outlet valve is at least a two position, three way actuator controlled valve.

12. The oil-water separator of claim 11, wherein the oil flow paths of the first and second oil separation chambers are consolidated through an oil manifold into a main oil outlet, and the oil manifold comprises the shared oil outlet valve.

13. The oil-water separator of claim 1, wherein the valve control system comprises one or more self-regulated check valves and one or more valve actuators in communication with a switch circuit and sensors for sensing a fluid condition in the first and second chambers to alternate opposing valve settings (a) and (b) between the first and second oil separation chambers.

14. The oil-water separator of claim 1, further comprising a pump for removing a gas from a sealed volume in order to leave behind a partial vacuum.

15. The oil-water separator of claim 14, wherein the pump is a vacuum pump.

16. The oil-water separator of claim 14, wherein a fluid trap is in fluid communication with the oil flow path and disposed downstream of the oil outlet and upstream of the pump.

17. The oil-water separator of claim 1, wherein the oil-water flow path to the oil-water inlet is a low turbulence flow path.

18. The oil-water separator of claim 17, wherein the low turbulence flow path is a substantially unobstructed conduit with bend angles of about 30 degrees or less.

19. The oil-water separator of claim 18, wherein the bend angles are about 22.5 degrees.

20. The oil-water separator of claim 1, wherein the chamber side walls taper upward to define a vertically narrowing oil recovery column.

21. The oil-water separator of claim 1, wherein the first and second oil-separation chambers are contained in the same housing.

22. The oil-water separator of claim 21, wherein the first and second oil separation chambers share a common side wall, the housing narrowing upward to define a vertically narrowing oil recovery column in each chamber such that an axis of symmetry extends in a generally vertical direction.

23. The oil-water separator of claim 1, wherein the first and second oil-separation chambers have approximately equal enclosure volumes capable of processing approximately equal volumetric flow rates.

24. The oil-water separator of claim 1, further comprising one or more additional distribution branches feeding one or more additional oil separation chambers, the valve control system capable of alternating opposing valve settings (a) and (b) between the first, second and the one or more additional oil separation chambers.

25. The oil-water separator of claim 1, wherein the oil-water main is a flexible conduit.

26. The oil-water separator of claim 1, wherein the oil-water main is in fluid communication with an attachment selected from a skimmer head and a dredge nozzle.

27. The oil-water separator of claim 1, wherein the mixed fluid stream comprises an oil-water mixture.

28. The oil-water separator of claim 27, wherein the oil-water mixture further comprises sediment, such as sand.

29. A method of separating fluids with different densities, such as oil from water, the method comprising:
supplying a fluid mixture to the oil-water main of an oil-water separator according to claim 1,
applying a partial vacuum to the oil outlet of the chamber having an open oil flow path to withdraw fluid therefrom, and
alternating valve settings (a) and (b) between the first and second oil separation chambers.

30. A kit for rapid deployment and oil-spill containment, the kit comprising an oil-water separator according to claim 1, and optionally, one or more of the following components selected from the group consisting of a vacuum pump, a skimmer head for attaching to the oil-water main, a dredge nozzle, a towable boom system for attaching and channeling product into the skimmer head, and a oil recovery tank.

* * * * *